US012122174B1

(12) United States Patent
Decompte et al.

(10) Patent No.: US 12,122,174 B1
(45) Date of Patent: Oct. 22, 2024

(54) TRANSFER PAPER FOR SUBLIMATION PRINTING

(71) Applicant: Ahlstrom Oyj, Helsinki (FI)

(72) Inventors: Alexandre Decompte, St.-Etienne de St-Geoirs (FR); Marco Aversa, Cirie (IT)

(73) Assignee: AHLSTROM OYJ, Helsinki (FI)

( * ) Notice: Subject to any disclaimer, the term of this patent is extended or adjusted under 35 U.S.C. 154(b) by 0 days.

(21) Appl. No.: 18/700,350

(22) PCT Filed: Nov. 4, 2022

(86) PCT No.: PCT/IB2022/060644

§ 371 (c)(1),
(2) Date: Apr. 11, 2024

(87) PCT Pub. No.: WO2023/079510

PCT Pub. Date: May 11, 2023

(30) Foreign Application Priority Data

Nov. 5, 2021 (EP) .................................... 21206672

(51) Int. Cl.
*B41M 5/50* (2006.01)
*B41M 5/035* (2006.01)
*D21H 19/44* (2006.01)

(52) U.S. Cl.
CPC .......... *B41M 5/0355* (2013.01); *D21H 19/44* (2013.01)

(58) Field of Classification Search
CPC ............................. B41M 5/0355; D21H 19/44
(Continued)

(56) References Cited

U.S. PATENT DOCUMENTS

2004/0197498 A1* 10/2004 Bi ........................ B41M 5/5218 428/32.34
2008/0229962 A1 9/2008 Shedd et al.
(Continued)

FOREIGN PATENT DOCUMENTS

EP 1500746 A2 1/2005
JP 2010089393 A 4/2010
JP 2017185728 A 10/2017

OTHER PUBLICATIONS

International Preliminary Report On Patentability for the corresponding International Application No. PCT/IB2022/060644; International Filing Date: Nov. 4, 2022; Date of Mailing: Sep. 25, 2023; 15 pages.

(Continued)

*Primary Examiner* — Betelhem Shewareged
(74) *Attorney, Agent, or Firm* — CANTOR COLBURN LLP

(57) ABSTRACT

The present disclosure relates to a transfer paper for sublimation printing comprising a fibrous substrate and an ink-receiving layer ink-receiving layer, wherein the ink-receiving layer comprises a cationic inorganic component, a cationic organic component or both in an amount of from 10 to 90 wt. %, optionally a filler in an amount of up to 75 wt. %, a hydrophilic binder in an amount of from 5 to 50 wt. %, and a hydrophobic binder in an amount of from 5 to 50 wt. %, based on the total weight of the ink-receiving layer. The disclosure also provides a method for preparing a transfer paper for sublimation printing, its use in a method for preparing a printed transfer paper, the printed transfer paper, its use in a method for decorating an article by sublimation and the decorated article.

18 Claims, 2 Drawing Sheets

(58) Field of Classification Search
USPC .......................................... 428/32.39, 195.1
See application file for complete search history.

(56) References Cited

U.S. PATENT DOCUMENTS

| | | | | |
|---|---|---|---|---|
| 2009/0123675 | A1* | 5/2009 | Shaw-Klein | B41M 5/52 428/32.25 |
| 2017/0305178 | A1* | 10/2017 | Kuhne | B41M 5/0256 |
| 2019/0366751 | A1 | 12/2019 | Mayade et al. | |

OTHER PUBLICATIONS

International Search Report and Written Opinion for the corresponding International Application No. PCT/IB2022/060644; International Filing Date: Nov. 4, 2022; Date of Mailing: Feb. 15, 2023; 12 pages.
The extended European search report for the corresponding European Application No. 21206672.4; Filing Date: Nov. 5, 2021; Date of Mailing: Apr. 5, 2022; 8 pages.

* cited by examiner

TRANSFER PAPER FOR SUBLIMATION PRINTING

CROSS REFERENCE TO RELATED APPLICATIONS

This application is a National Stage application of PCT/IB2022/060644, filed Nov. 4, 2022, which claims benefit of European Application No. 21206672.4 filed on Nov. 5, 2021, both of which are incorporated by reference herein in their entirety.

TECHNICAL FIELD

The present disclosure relates to a transfer paper for sublimation printing, and more particularly to a coated transfer paper for high-end applications, as well as a method of preparing the transfer paper. Further aspects of the present disclosure include a printed transfer paper and a method of preparing the same, in particular but not exclusively by inkjet printing. Moreover, the present disclosure relates to a decorated article and a method of decorating the article by sublimation printing.

BACKGROUND ART

It can be difficult to obtain high fidelity images on certain articles by printing directly on same. Such articles include textiles (e.g., fabric and clothing), in particular polyester textiles, and other articles having a metal, glass, ceramic, plastic, or wood surface. Sublimation printing techniques are often used to provide images on such articles by using sublimable inks. Sublimable inks are printed indirectly onto the final article. More particularly, the inks are first printed on a so-called transfer paper and then transferred from the printed transfer paper to the final article using heat and pressure. The patent application US 2008/0229962 describes an example of such a printing process.

However, not all transfer papers for sublimation printing are equally suited. Certain transfer papers tend to absorb the solvent coming from the ink not fast enough, which increases the risk of the ink being smeared or to spread upon drying. Transfer papers that absorb the solvent coming from the ink too fast, however, tend to have the problem of the ink being pulled with the solvent into the paper. Hence, in order to ensure that a sufficient amount of ink is available for sublimation printing, a relatively large amount of sublimable ink has to be printed onto such transfer paper. This may cause a loss in printing definition upon transfer, for example due to the smearing of the ink caused by the large amounts of ink printed onto the transfer paper, meaning that there are differences between the original digital file and the printing by sublimation on the final article, while the process itself is less efficient.

Current state-of-the-art high-end transfer papers for sublimation printing, having a high printing definition generally comprise some kind of coating or agent on the surface of the fibrous substrate. In several publications it is tried to influence the ability of the transfer paper to handle the sublimable ink and thus to provide high-fidelity images by adapting the properties of the paper substrate and the coating layer.

It is known to use cationic agents in small proportions as ink fixing agents for inkjet printing with the aim of immobilising the ink on the surface and avoiding bleeding of the ink in water. Patent application EP 3 568 521 for instance provides a transfer paper for sublimation printing having one or more cationic agents on at least one face thereof. However, there is still potential for improvements.

In spite of the many transfer papers for sublimation printing that are available on the market, none of them provides an instant drying of the sublimable ink, a perfect printing definition and the absence of defects at the same time. Said defects include dusting upon storage, solubility of components of the transfer paper in the sublimable ink or back gasing during the printing transfer process.

Technical Problem

Accordingly, there is a demand for a transfer paper for sublimation on which sublimable ink dries quickly and which results in a substantially perfect printing definition without any substantial defects occurring upon the printing process and the sublimation transfer process. Furthermore, there is a demand for transfer papers which can be printed with a high definition and having a quick drying time with standard inks or gel-like inks. Moreover, there is a demand for a method of preparing and printing such a transfer paper as well as for a method of decorating an article and the provision of an article decorated with perfect printing definition.

SUMMARY OF THE DISCLOSURE

The present disclosure is aimed at solving at least partially the problems of the prior art by providing a transfer paper for sublimation printing, comprising a fibrous substrate and an ink-receiving layer. The ink-receiving layer comprises a cationic inorganic component, or a cationic organic component, or both in an amount of from 10 to 90 dry wt. %, optionally a filler in an amount of up to 75 dry wt. %, a hydrophilic binder in an amount of from 5 to 50 dry wt. %, and a hydrophobic binder in an amount of from 5 to 50 dry wt. %. The amounts in dry wt. % are based on the total dry weight of the ink-receiving layer.

It has been found that the transfer paper for sublimation printing comprising an ink-receiving layer as specified above simultaneously provides a quick drying of the sublimable ink, a substantially perfect printing definition and the absence of dusting or other defects during storage, printing or the sublimation transfer process.

Besides, the present disclosure also provides a method for preparing a transfer paper for sublimation printing, its use in a method for preparing a printed transfer paper, the printed transfer paper, its use in a method for decorating an article by sublimation and the decorated article.

Where the present description refers to "preferred" embodiments/features, combinations of these preferred embodiments/features shall also be deemed as disclosed as long as this combination is technically meaningful.

Hereinafter, the use of the term "comprising" should be understood as disclosing in a non-limited way, that is to say that additional components or steps can be present or implemented, as long as this is technically meaningful. For a more restricted embodiment, the terms "consisting of" will be used and have to be understood as disclosing in a limited way, that is to say without any additional component or step.

DETAILED DESCRIPTION OF THE DISCLOSURE

The first embodiment of the present disclosure relates to a transfer paper for sublimation printing, comprising a fibrous substrate and an ink-receiving layer. A transfer paper as used herein refers to a paper that is printed with sublimable ink before, in a next step, the print is transferred from the printed transfer paper to an article as described below by using heat and pressure.

The term "sublimable ink" as used herein, refers to a material comprising a sublimable dye as a colorant and a solvent as a carrier. In other words, the solvent allows the sublimable dye to be applied onto the transfer paper as the sublimable dye is typically solid at room temperature. Hence, it would be difficult to print it onto a substrate without the use of a carrier solvent. The sublimable ink may be provided as a water-based ink wherein the carrier includes water.

The sublimable dye used for sublimation printing in the context of the present disclosure is not particularly limited and may be any conventional sublimable dye. Generally, sublimable dyes are negatively charged or at least a nucleophile, meaning that it coordinates or binds electrophiles by donating an electron pair. Exemplary sublimable dyes that can be found in sublimable inks include without being limited thereto, for example, azo dyes, nitro dyes, anthraquinone dyes, quinoline dyes and fluoran dyes. In particular embodiments of the present disclosure, the sublimable dye can be a sublimable dye coming from the following inks: SAWGRASS Sublijet black, or EPSON UltraChrome DS.

Figure 1:
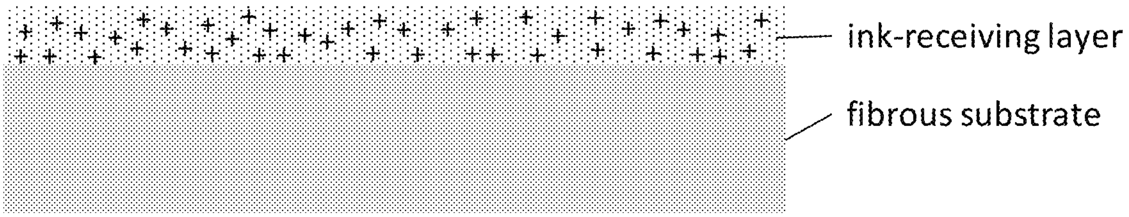
FIG. 1: Represents a schematic sketch of a transfer paper for sublimation printing according to the present disclosure.

The transfer paper of the present disclosure comprises at least two layers as described below in greater detail. FIG. 1 represents the fibrous substrate and the ink-receiving layer coated on the fibrous substrate. The ink-receiving layer is provided to receive the sublimable ink when printing the transfer paper, for example by ink-jet printing. The ink-receiving layer may be provided on one or both surfaces of the fibrous substrate. However, as a sublimable ink is typically applied on merely one surface of a transfer paper for sublimation printing, the ink-receiving layer of the present disclosure is preferably provided on only the surface of the fibrous substrate aimed to be printed with the sublimable ink.

The ink-receiving layer may be formed directly on the fibrous substrate or at least one additional layer may be formed on the fibrous substrate before the ink-receiving layer is formed. Such an additional layer may be any additional layer, e.g., to adjust the properties of the fibrous substrate. Preferably, the ink-receiving layer is formed directly on the fibrous substrate to not disturb the interplay between the fibrous substrate and the ink-receiving layer of the disclosure as described in further detail below.

A fibrous substrate in the sense of the present disclosure refers to a base material, which substantially has a fibrous structure that can be described as a thin, flexible, but non-elastic sheet. The fibrous substrate is not particularly limited and may be any conventional fibrous substrate, such as a woven or a non-woven substrate, which is suitably flexible and has sufficient strength for handling, printing, copying, coating, heat transfer, and other operations associated with the present disclosure.

The fibrous substrate in the transfer paper facilitates drying and a high printing definition when the sublimable ink is applied onto the paper as it absorbs the carrier solvent. This means that the solvent is moved away from the sublimable dye, which is concentrated at or near the paper surface due to the properties of the ink-receiving layer are specified below.

Highly porous fibrous substrates are less preferred as they may absorb large amounts of any material coated thereon. Moreover, if a fibrous substrate absorbs the carrier solvent too quickly, the solvent may pull the sublimable dye deeper into the paper. Hence, the fibrous substrate of the present disclosure may preferably have a dense structure with a low air permeability. The "air permeability" as referred to herein is the Bendtsen porosity, measured in accordance to ISO 5636-3 standard, which corresponds to the rate of airflow passing perpendicularly through a known area under a prescribed air pressure differential between the two surfaces of a material. The concept of air permeability is widely used in the textile industry to interpret the intrinsic characteristics of a fabric. According to the ISO 5636-3 standard, a 10 $cm^2$ sample is subjected to a pressure difference of 1.47 kPa to measure the air permeability. Preferably, the fibrous substrate of the present disclosure has a Bendtsen Air Permeability of less than 200 mL/min measured according to ISO 5636-3.

If, however the fibrous substrate does not absorb the carrier solvent fast enough, the sublimable ink may smear or spread on the surface of the transfer paper. Accordingly, the selection of the fibrous substrate may assist in the ability of the transfer paper to handle the sublimable ink and to provide the desired high-fidelity image. The water absorption capacity in the sense of how much water the fibrous substrate can absorb may be measured according to the Cobb standard ISO 535. The Cobb value specifies the amount of water that is taken up by a defined area of fibrous substrate through one-sided contact with water, within a certain amount of time. Preferably the fibrous substrate of the present disclosure has a Cobb value of above 40 $g/m^2$, preferably of 40-90 $g/m^2$ measured according to ISO 535 standard.

In a particularly preferred embodiment of the present disclosure, the fibrous substrate may have a Bendtsen Air Permeability of less than 200 mL/min measured according to ISO 5636-3 and a Cobb value of above 40 $g/m^2$, preferably of 40-90 $g/m^2$ measured according to ISO 535.

The fibrous substrate of the present disclosure may be the base material for any printing process. Typically, the fibrous substrate sheet is a woven or a nonwoven web made from natural fibers, synthetic fibers or blends thereof. A web structure refers to a fabric-like sheet having a structure of individual fibers that are woven or knitted in an identifiable manner. A nonwoven structure refers to a fabric-like sheet having a structure of individual fibres that are entangled and interlaid with each other in a non-identifiable manner. Nonwovens can be formed from many processes such as, for example, spin laying, carding, air laying (also known as dry laying) and water laying processes. These result in spin-laid, carded, air-laid (also known as dry-laid) and wet-laid nonwovens respectively.

Natural fibers may comprise natural cellulosic fibers, including pulp, or man-made cellulosic fibers or a mixture of both. Man-made cellulosic fibers are also known as regenerated cellulose fibers, such as for example Lyocell and Viscose, aka Rayon. Synthetic fibers for a fibrous substrate may comprise acrylic, polyester or nylon fibers.

The fibrous substrate of the present disclosure may comprise further additives in order to adjust the properties of the fibrous substrate. Such additives include fillers as described below, binders, such as carboxymethyl cellulose (CMC), wet strength agents such as PAE (polyamide-epichlorohydrin) Kymene, or sizing agents. Preferably the total amount of additives in the fibrous substrate of the present disclosure is of 15 dry wt. % or lower based on the total dry weight of the fibrous substrate.

Fillers for papermaking are also known as pigments or minerals. The class of fillers can be described as inorganic, particulate minerals and may be divided into natural and synthetic fillers, whereas some minerals, such as calcium carbonate, are available in natural and synthetic form. Typical fillers for papermaking comprise calcium carbonate, clay minerals, such as kaolin or talc, titanium dioxide, silicate, hydroxide minerals, calcium sulphate and mixtures thereof. Main benefits of filler use relate to an improved brightness, drying of the paper or control of pore size. Preferably the amount of fillers in the fibrous substrate of the present disclosure is 15 dry wt. % or lower, more preferably 10 dry wt. % or lower, based on the total dry weight of the fibrous substrate, and most preferably the fibrous substrate does not comprise fillers.

The ink-receiving layer of the present disclosure comprises:

a. a cationic inorganic component, a cationic organic component or both,
b. optionally a filler,
c. a hydrophilic binder, and
d. a hydrophobic binder.

The term "organic" as used herein refers to a component which always contain carbon, whereas an "inorganic" component includes metals and minerals as well as organometallic compounds. Hence, an "inorganic" component is mostly free from carbon. In the following, the cationic inorganic, the cationic organic component or both are also referred to as cationic component in general which is specified in the following in further detail.

A cationic component (A) as used herein is not limited to a particular chemical composition. It refers to a water-insoluble, preferably particulate, backbone structure on which the cationic charge is located. The cationic component of the present disclosure is a pure substance consisting of atoms of two or more chemical elements, wherein, in contrast to a mixture of substances, the atom species are in a specific ratio to each other. The cationic component has anionic counterions which are weakly bound to the cationic backbone. The cationic charge is therefore easily accessible and has a high bending affinity to a sublimable dye being at least partially negatively charged or nucleophile as specified above. The ink-receiving layer of the disclosure is constructed to retain the sublimable dye at or near the surface of the transfer paper in order to facilitate its transfer during the sublimation printing and prevent the diffusion of the dyes present in the ink in the fibrous substrate. It has surprisingly been found that the present disclosure achieves high definition within sublimation printing as the sublimable dye remains at or near the surface of the transfer paper. Furthermore, the ink-receiving layer of the present disclosure reduces the amount of the sublimable ink needed to provide the desired high definition.

The cationic component may be specified by its cationic charge, e.g., the specific charge density measured at the surface of a transfer paper. The specific charge density is obtained by a quantitative charge measurement as described in the experimental part below by using a Mütek™ PCD-05 device. Since a paper sample cannot be transferred to the cell of the device directly, a back-titration is performed. In this back-titration, the transfer paper is contacted with a solution of an anionic polyelectrolyte with a known concentration. The concentration of the anionic polyelectrolyte in the solution decreases as it is consumed by the cationic component present in the ink-receiving layer of the transfer paper. The remaining concentration of the anionic polyelectrolyte is obtained by titrating the solution with a cationic polyelectrolyte titrant. Titration is stopped as soon as the point-of-zero-charge (0 mV) is reached. From the difference of the anionic polyelectrolyte concentration, the charge at the surface of the transfer paper can be calculated. A "polyelectrolyte" as used herein is a polymer, e.g., a macromolecule, that dissolves in water or other polar solvents under dissociation into an overall negatively or positively charged polymer and a charge equivalent amount of counter anions.

Preferably, the cationic component according to the present disclosure has a porous structure so as not to negatively affect the properties of the fibrous substrate, e.g., by disturbing the removal of the carrier solvent from the sublimable dye. Hence, the present disclosure provides a transfer paper that ensures very quick drying times.

The ink-receiving layer of the present disclosure comprises the cationic component in an amount of from 10 to 90 dry wt. %, based on the total dry weight of the ink-receiving layer. When using an ink-receiving layer comprising less than 10 dry wt. % of the cationic component, the effect of concentrating a sublimable dye at or near the surface of the transfer paper is not achieved. When an ink-receiving layer comprises more than 90 dry wt. % of the cationic component, the ink-receiving layer is not sufficiently bound to the fibrous substrate and dusting occurs, whereby the ink-receiving layer detaches, crumbles or is easily rubbed off from the fibrous substrate.

The filler (b) within the ink-receiving layer may be the same as the filler for papermaking as described above. Exemplary embodiments of the filler within the ink-receiving layer will be specified below. An inorganic mineral filler according to the presence disclosure is a neutral substance or does not have easily accessible charges available. Hence, the filler in the ink-receiving layer may have a net charge of about zero and cannot be measured by the quantitative charge measurement as described above. Furthermore, a filler within the ink-receiving layer according to the present disclosure generally has a porous structure to facilitate the migration of the ink solvent, e.g., water, from the ink-receiving layer to the fibrous substrate. As a result, the properties of the fibrous substrate are not affected by the ink-receiving layer.

The filler is present in an amount of up to 75 dry wt. % in the ink-receiving layer of the present disclosure. Its presence in the ink-receiving layer is not stringently required. When using an ink-receiving layer comprising more than 75 dry wt. % of the filler, the cationic component is overly diluted and the effect of concentrating a sublimable dye at or near the surface of the transfer paper is not achieved.

A binder in the sense of the present disclosure is a polymeric component. A polymer according to the present disclosure is a natural or synthetic substance composed of macromolecules, that are multiples of one or more monomeric units.

The hydrophilic binder (c) as used herein refers to binders comprising polar functional groups. These polar functional groups comprise one or more of —(C═O) OH, —OH, a primary, secondary, tertiary and quaternary ammonium compound, —(C═O) $NH_2$, —$NO_2$, —($SO_2$) OH, —SH, —($SO_2$) $NH_2$, —$SO_2$, —C≡N, —N≡C, —N═O and ions thereof formed by hydrogen addition or cleavage. Preferably, the polar functional groups comprise one or more of —OH, —$O^-$ and a quaternary ammonium compound. A quaternary ammonium compound as used herein is an organic ammonium compound in which all four valances of the nitrogen atom are bound to carbon. Hence, a quaternary ammonium is a salt (ionic compound) consisting of positively charged nitrogen (cation) and an anion. An example for a hydrophilic binder comprising the quaternary ammonium compound ammonium chloride is polydiallyldimethylammonium chloride (polyDADMAC). Examples for a hydrophilic binder are polyvinyl alcohol (PVOH) or starch.

Preferably the hydrophilic binder (c) comprises at least 10 mol %, preferably at least 15 mol %, preferably at least 20 mol %, preferably at least 23 mol % and most preferably at least 30 mol % of a polar functional group as defined herein per monomeric unit of the polymeric component. Accordingly, polyDADMAC comprises 30 mol % ammonium chloride per monomeric unit. PVOH comprises 38 mol % hydroxide per monomeric unit and starch comprises 23 mol % hydroxide per monomeric unit.

Most hydrophilic binders are soluble in water at temperatures between 35-100° C. due to their high amount of polar functional groups per monomeric unit. In the case that a water-based sublimable ink is applied to the transfer paper, a hydrophilic binder may ensure the accessibility of the ink-receiving layer for a water-based sublimable ink, which allows a contact of the sublimable dye with the cationic component. Moreover, the hydrophilic binder ensures the wettability of the transfer paper, thus improving the print definition on the transfer paper as well as on an article decorated by sublimation printing as defined below.

However, the inventors have surprisingly found that the use of a hydrophobic binder as described below in addition to the hydrophilic binder improves the properties of the transfer paper of the present disclosure. Without wishing to be bound by any theory, it is believed that the hydrophilic binder tends to swell upon contact with the water-based sublimable ink. A swelling of the binder however is not favourable as it may close the porous structure of the transfer paper. This may cause an ink being applied to the transfer paper to spread on the surface thereof. Only by using a hydrophilic binder in combination with the hydrophobic binder, such negative effects can be reduced while the accessibility of the ink-receiving layer for the sublimable dye is maintained. Typically, the binder is aimed at binding the filler and the cationic agent while keeping the porosity of the fibrous substrate.

The ink-receiving layer of the present disclosure comprises the hydrophilic binder (c) in an amount of from 5 to 50 dry wt. %, based on the total dry weight of the ink-receiving layer. When using an ink-receiving layer comprising less than 5 dry wt. % hydrophilic binder, the cationic component is not sufficiently bound to the fibre substrate. By sufficiently bound, it is meant that the binder material achieves a sufficient stability of the ink-receiving layer itself and the interface between ink-receiving layer and fibrous substrate. Dusting of a printing machine, aimed at printing the transfer paper, may occur from an insufficient binding, whereby the ink-receiving layer detaches, crumbles or is easily rubbed off from the fibrous substrate. When using an ink-receiving layer comprising more than 50 dry wt. % of the hydrophilic binder, the porous structure of the ink-receiving layer resulting from the cationic component and/or a filler may be blocked and the properties of the fibrous substrate as described above would be affected.

The term hydrophobic binder (d) as used herein refers to binders not comprising polar functional groups as defined above. Preferably the hydrophobic binder comprises less than 10 mol %, preferably less than 6 mol %, preferably less than 4 mol %, preferably less than 2 mol % and most preferably no polar functional group per monomeric unit of the polymeric component.

As explained above, the presence of a hydrophobic binder in addition to the hydrophilic binder limits a swelling of the hydrophilic binder when contacted with the water-based sublimable ink.

The ink-receiving layer of the present disclosure comprises the hydrophobic binder (d) in an amount of from 5 to 50 dry wt. %, based on the total dry weight of the ink-receiving layer. When using an ink-receiving layer comprising less than 5 dry wt. % hydrophobic binder, the cationic component is not sufficiently bound to the fibre substrate which will provoke the same issues as described above for the hydrophilic binder. When using an ink-receiving layer comprising more than 50 dry wt. % of the hydrophobic binder, the porous structure of the ink-receiving layer would be blocked and the properties of the fibrous substrate as described above would be affected.

The binder mixture according to the present disclosure not only ensures the accessibility of the ink-receiving layer for the sublimable dye and keeps a potential swelling that may result from the ink solvent (carrier) in acceptable ranges. The inventive binder mixture of the transfer paper described herein also allows the use of a very high amount of the cationic component, while ensuring a sufficient binding of the ink-receiving layer to the fibrous substrate. Accordingly, high dye binding properties may be obtained even in thin ink-receiving layers. This reduces negative effects, such as long drying times limiting the speed of printing as well as a smearing, spreading or feathering of the ink, generally accompanied by the use of binders in coating layers. Moreover, the disclosed binder mixture allows the provision of a very thin ink-receiving layer. Without wishing to be bound by any theory, it is believed that a thin ink-receiving layer may be preferable with regard to preserving the properties of the fibrous substrate, e.g., the Cobb value as described above which are directly related to the ink-absorbing ability of the transfer paper. Last but not least, the possibility of a thin ink-receiving layer is preferable in view of production efficiency and high precision printing.

The ink-receiving layer of the present disclosure may optionally comprise further additives known for a person skilled in the art of paper manufacturing. Such additives may include a thickener, a strengthener, a dispersing agent, a rheology modifier, an optical brightener, a lubricant, a dye, a soluble dye or a sizing agent.

In view of the above explanation, the amount of the cationic inorganic component, the cationic organic component or both and the filler in the ink-receiving layer is preferably greater than 60 dry wt. %, preferably greater than 70 dry wt. % and most preferably greater than 75 dry wt. %, based on the total dry weight of the ink-receiving layer.

In another preferred embodiment, a mass ratio of the cationic inorganic component, the cationic organic component or both, e.g., the cationic component, and the filler to the hydrophilic binder and the hydrophobic binder, i.e. the binder mixture, is of from 85:15 to 75:25, preferably of from 84:16 to 78:22 and most preferably of from 82:18 to 80:20. Particularly improved drying times, printing definition and low dusting may be achieved within these ratios in line with above explanations.

Preferably, a mass ratio of the cationic inorganic component, the cationic organic component or both, e.g., the cationic component, to the filler is of from 80:20 to 20:80, preferably of from 60:40 to 22:78 and most preferably of from 35:65 to 24:76. With decreasing amount of the cationic component, the printing definition decreases. This is probably related to a decreased number of binding sites for the sublimable ink. Moreover, a mixture of the cationic component and a filler as defined above may be favourable. Without wishing to be bound by any theory, this result from the porous structure of common inorganic mineral fillers contributing to the overall porous structure of the ink-receiving layer of the present disclosure. It is believed that the interplay of the porous structure of the ink-receiving layer, which is not affected by the use of binders, with the fibrous substrate ensures the improved drying times, printing definition and low dusting achieved within above ratios. While it is likely that the same effect may be achieved by adapting the porous structure of the cationic component and not using any filler, the presence of some filler is preferred as it is easily obtainable in large amounts.

Preferably, a mass ratio of the hydrophilic binder to the hydrophobic binder is of from 65:35 to 35:65, preferably of from 60:40 to 34:66, preferably of from 50:50 to 36:64 and most preferably of from 45:55 to 38:62. In a particularly preferred embodiment are the above ranges related to the use of a water-based sublimable ink. Without wishing to be bound by any theory it is believed that the hydrophilic binder enhances the accessibility of the ink-receiving layer of the present disclosure for a water-based sublimable dye. However, a hydrophilic binder may also swell upon contact with the water-based sublimable ink. In consequence, drying times may increase as it may take longer for the water molecules incorporated into the swollen binder structure to evaporate. Moreover, the swelling may lead to a certain degree of smearing of the ink. In turn, it is believed that a too high amount of the hydrophobic binder tends to repel the water-based sublimable ink. In this scenario the ink would tend to remain on the surface of the transfer paper. In consequence the carrier of the dye may be absorbed insufficiently, whereas the dye may be hindered in getting into contact with the cationic component of the ink-receiving layer. Hence, a too high amount of the hydrophobic binder would likewise lead to some degree of smearing of the ink and a loss in the printing definition.

In a particular preferred embodiment of the present disclosure, the amount of the cationic component and the filler in the ink-receiving layer is preferably greater than 60 dry wt. %, preferably greater than 70 dry wt. % and most preferably greater than 75 dry wt. %, based on the total dry weight of the ink-receiving layer, while a mass ratio of the cationic component to the binder mixture is of from 85:15 to 75:25, preferably of from 84:16 to 78:22 and most preferably of from 82:18 to 80:20, a mass ratio of the cationic component to the filler is of from 80:20 to 20:80, preferably of from 60:40 to 22:78 and most preferably of from 35:65 to 24:76, and the mass ratio of the hydrophilic binder to the hydrophobic binder is of from 65:35 to 35:65, preferably of from 60:40 to 34:66, preferably of from 50:50 to 36:64 and most preferably of from 45:55 to 38:62.

In a preferred embodiment, the cationic inorganic component comprises one or more selected from the group consisting of cationic silica and cationic titanium oxide. The term "cationic" in relation to silica and titanium oxide is the same as defined above in relation with the cationic component (a) described in detail above. Preferably the cationic inorganic component comprises cationic silica. In a particular embodiment of the present disclosure such cationic silica comprises cationic colloidal silica, such as e.g., cationic LUDOX® particles, which may be obtained by ion exchange.

In another preferred embodiment, the cationic organic component comprises one or more selected from the group consisting of cationic polymer, cationic organosilica and cationic metal-organic framework. The term "cationic" in relation to polyelectrolyte, organosilica and metal-organic framework is the same as defined above in relation with the cationic component (a) described in detail above. In a particular embodiment of the present disclosure cationic organosilica comprises cationic colloidal silica, such as e.g., cationic LUDOX® particles, which may be obtained by modifying the surface of silica in order to introduce cationic functional groups.

A cationic component according to the present disclosure may be obtained by any suitable method as long as an easily accessible cationic backbone structure having weakly bound and thus exchangeable anions is obtained.

In another preferred embodiment the filler within the ink-receiving layer according to the present disclosure comprises one or more selected from the group consisting of silicate mineral, oxide mineral, hydroxide mineral, sulfate mineral and carbonate mineral. Preferably the filler comprises silicate mineral, more preferably the filler comprises clay and most preferably the filler comprises kaolinite. Moreover, the filler within the ink-receiving layer according to the present disclosure is preferably calcinated.

In another preferred embodiment according to the disclosure, the hydrophilic binder comprises one or more selected from the group consisting of polyvinyl alcohol, starch, CMC, alginate and guar gum. Preferably the hydrophilic binder comprises polyvinyl alcohol, starch or CMC.

In another preferred embodiment, the hydrophobic binder comprises one or more selected from the group consisting of styrene-butadiene rubber, styrene acrylate, butyl acrylate, acrylonitrile and copolymers thereof. Preferably the hydrophobic binder is butyl-acrylate styrene acrylonitrile.

In an embodiment of the present disclosure where the cationic component is a cationic polymer, the amount of the filler may be increased and, depending on the amount of polar functional groups as defined above per monomeric unit of the cationic polymer, the amount of either the hydrophilic binder or the hydrophobic binder may be decreased.

In a particularly preferred embodiment, the transfer paper of the present disclosure presents an ink-receiving layer comprising cationic silica, cationic organosilica or both as the cationic component, a calcinated clay as the filler, polyvinyl alcohol as hydrophilic binder and butyl-acrylate styrene acrylonitrile as hydrophobic binder.

Since the ink-receiving layer of the present disclosure preferably does not affect the properties of the porous substrate, the transfer paper may preferably have a Cobb value of above 40 $g/m^2$, preferably of 40 to 90 $g/m^2$ when measured according to ISO 535 standard.

Moreover, in another preferred embodiment, the transfer paper may have a Bendtsen Air Permeability of less than 100 mL/min, when measured according to ISO 5636-3 standard.

In a particularly preferred embodiment of the present disclosure, the transfer paper may have a Cobb value of above 40 $g/m^2$, preferably of 40 to 90 $g/m^2$ when measured according to ISO 535 standard and a Bendtsen Air Permeability of less than 100 mL/min, when measured according to ISO 5636-3 standard.

Preferably, the transfer paper of the present disclosure may have an ink drying time of below 5 seconds due to the composition of the ink-receiving layer in order to minimise the risk of smearing the sublimable ink applied to the transfer paper and to achieve shortened manufacturing times when preparing the printed transfer paper as described below.

When specifying the cationic component by the specific charge density measured at the surface of a transfer paper, the transfer paper may preferably have a specific charge density of between $10^4$ to $10^6$ C/m$^2$, preferably between $3*10^4$ to $7*10^5$ C/m$^2$ and more preferably between $6.20*10^4$ to $4.70*10^5$ C/m$^2$, when measured according to the method described in the experimental part below.

The transfer paper may moreover be specified by the Parker Print-Surf (PPS) roughness. The PPS roughness is a significant factor specifying the printability of papers. By measuring the PPS roughness under conditions simulating the way an ink is applied during a printing process the PPS roughness correlates well to the print quality. Preferably the transfer paper of the present disclosure may have a PPS roughness of 3 to 5 μm, preferably of 3.5 to 4.5 μm and most preferably of 4 μm measured according to ISO 8791-4:2007 (with a hard roll and a pressure of 1000 kPa). Typically, PPS roughness below 3 μm are very difficult to obtain. Moreover, if the PPS roughness is more than 5 μm, the print definition on the transfer paper and on the final product will be affected.

The transfer paper, the ink-receiving layer and the fibrous substrate of the present disclosure may have any basis weight and thickness suitable to provide properties desired for a transfer paper. The term "basis weight" as used herein refers to the area density of a substrate. The basis weight is usually expressed in weight per square meter (gsm=g/m$^2$). The terms "basis weight" and "grammage" can be used interchangeably for the purposes of the present disclosure unless otherwise specifically indicated. The basis weight as specified herein was measured following the ISO 536 standard. The basis weight relates to the thickness of a substrate. In the present disclosure the thickness is measured following the ISO 534 standard.

In a preferred embodiment, the ink-receiving layer may have a basis weight of 3 to 10 g/m$^2$, preferably of 4 to 9 g/m$^2$, more preferably of 5 to 8 g/m$^2$ and most preferably of 6 to 7 g/m$^2$. Furthermore, the ink-receiving layer may preferably have a thickness of 3 to 10 μm, more preferably of 4 to 9 μm, more preferably of 5 to 8 μm and most preferably of 6 to 7 μm.

In another preferred embodiment the fibrous substrate may have a basis weight of 25 to 140 g/m$^2$, preferably of 35 to 120 g/m$^2$, more preferably of 40 to 100 g/m$^2$ and most preferably of 45 to 80 g/m$^2$. At a basis weight below 25 g/m$^2$ the dimensional stability of a fibrous substrate may suffer so that such a fibrous substrate may not be suitable for its use in a transfer paper.

In a preferred embodiment the transfer paper may have a basis weight of 28 to 150 g/m$^2$, preferably of 39 to 129 g/m$^2$, more preferably of 45 to 108 g/m$^2$ and most preferably of 51 to 87 g/m$^2$. Also, the transfer paper may preferably have a thickness of at least 50.5 μm, more preferably of 56 to 305 μm and most preferably of 101.5 to 204 μm.

Figure 2:
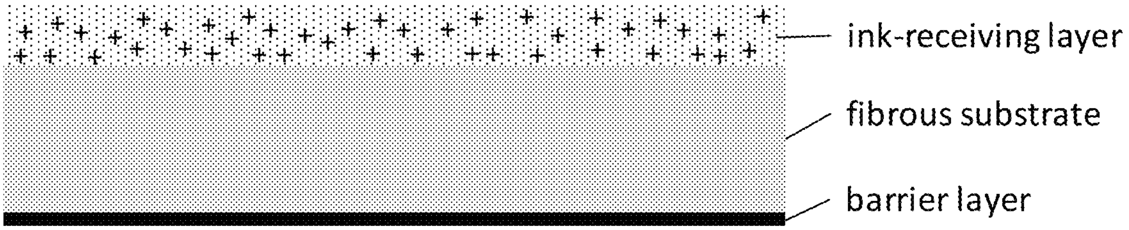
FIG. 2: Represents a schematic sketch of an alternative embodiment of the transfer paper for sublimation printing according to the present disclosure.

According to an alternative embodiment, the transfer paper of the present disclosure comprises at least three layers. In addition to the two layers described above, the fibrous substrate and the ink-receiving layer, the transfer paper may comprise a barrier layer on a surface of the fibrous substrate that is opposite to the surface of the fibrous substrate carrying the ink-receiving layer. This alternative embodiment is illustrated by FIG. 2.

The barrier layer according to the present disclosure prevents a back gasing, which occurs upon transfer of the sublimable ink from a transfer paper to a substrate by the sublimation process. When the sublimable ink is heated and in a gaseous form, its movement is not limited into a certain direction but will take place uniformly in all directions. Hence, a certain amount of sublimable ink may be lost, in particular over the backside of a transfer paper, called back gasing. A known method used in the art of manufacturing transfer papers to avoid this phenomenon is the provision of the barrier layer on the transfer paper as described above. For common transfer papers comprising a barrier layer, often increased drying times are observed.

The chemical composition of the barrier layer is not particularly limited and may be any conventional barrier layer known in the art which is suitably for handling, printing, coating, heat transfer, and other operations associated with the present disclosure. Without being limited hereto, the barrier layer may comprise starch, polyvinyl alcohol (PVOH) or an aluminum foil. In a particularly preferred embodiment of the present disclosure, the barrier layer may be starch. Surprisingly, it has been found that the transfer paper of the present disclosure achieves very low drying times even when it comprises a barrier layer.

The barrier layer may be formed directly on the fibrous substrate or at least one additional layer may be formed on the fibrous substrate before the barrier layer is formed. Such an additional layer may be any of the same or a different additional layer that might be disposed between the fibrous substrate and the ink-receiving layer as specified above. The barrier layer as well as the additional layer may comprise some type of visual indicator (e.g., a pigment or dye) that allows the user of the transfer paper to immediately appreciate which surface of the transfer paper does not contain the ink-receiving layer and hence which is the surface intended to receive the sublimable ink. The pigment or dye that is provided as part of the sizing agent may be selected so that it does not transfer during sublimation processing (e.g., it does not itself act as a sublimable ink). This barrier layer enables a decrease of the Bendtsen Air Permeability of the paper. Accordingly, the transfer paper comprising this barrier layer has a Bendtsen Air Permeability of less than 50 ml/min and more preferably of less than 10 ml/min.

Preferably the cationic compound of the present disclosure is a cationic inorganic component based on particles having a particle size of less than 1 μm. This means that when preparing an ink-receiving composition to form the ink-receiving layer as described below, the cationic component has a particle size of less than 1 μm.

Preferably, the filler in the ink-receiving layer is based on particles wherein at least 50% of the particles have a particle size of less than 2 μm. This means when preparing an ink-receiving composition to form the ink-receiving layer as described below, at least 50% of the particles have a particle size of less than 2 μm. Preferably the filler particles are spherical or block-shaped particles.

The particle size and shape of cationic component particles and filler particles are determined by SEM (scanning electron microscopy).

Another aspect of the present disclosure relates to a method for preparing the transfer paper for sublimation printing as specified above. The method comprises the steps of:

i. providing a fibrous substrate,
ii. preparing an aqueous dispersion comprising the cationic inorganic component, the cationic organic component or both, the hydrophilic binder, the hydrophobic binder and optionally the filler to give an ink-receiving composition, and
iii. applying the ink-receiving composition onto the fibrous substrate and drying the ink-receiving composition to form the ink-receiving layer.

The fibrous substrate within the method of preparing the transfer paper of the present disclosure is as defined above.

The ink-receiving composition is an aqueous, e.g., water-based, dispersion of the cationic component, optionally the filler, the hydrophilic binder and the hydrophobic binder as specified above. The term "dispersion" can be used interchangeably with the term "emulsion" for the purposes of the present disclosure unless otherwise specifically indicated. If necessary to improve solubility of the hydrophilic binder and the hydrophobic binder in water, the water-binder mixture may be heated before adding the cationic component and optionally the filler. The amount of water in the ink-receiving composition may be individually adjusted. For instance, the amount of water may depend from the method or temperature when applying the composition onto a fibrous substrate or from the fibrous substrate itself. In a preferred embodiment, the solid content in the aqueous ink-receiving composition dispersion is adjusted to from 10 to 50 wt. %, preferably to from 20 to 40 wt. % and more preferably to from 25 to 35 wt. %.

Before applying the ink-receiving composition according to the present disclosure onto one or both surface of a fibrous substrate, the composition may optionally be cooled. The method for applying the coating composition is not particularly limited and can be performed by blade coating, air knife coating, roll coating, curtain coating, spray coating, size press coating (e.g. thin press coating), film-press (also called metering size-press), and cast coating. For lab prototypes, a Meyer rod may be used whereas in industrial applications, a blade may be used for the coating.

One advantage of the ink-receiving layer according to the disclosure is that it can be applied on the fibrous substrate "online." The expression "online" refers to the application of the ink-receiving composition during the manufacturing of the transfer paper for sublimation printing. Accordingly, as the paper is made, the ink-receiving composition may be applied relatively soon after the fibrous substrate is formed. By applying the ink-receiving composition "online" it is possible to provide the transfer paper of the disclosure with high production efficiency compared to an "offline" processing where the fibrous substrate may have to be provided into the second set up for applying the ink-receiving composition thereon, probably even after shipping it to another location.

After applying the ink-receiving composition to the fibrous substrate, the paper is dried. When the ink-receiving composition is applied "online", the drying is preferably accomplished in a drying section of the paper machine. Any means of drying may be used, such as infrared radiation, hot air, heated cylinders or any combination thereof as well as drying at room temperature.

After drying the ink-receiving composition, the ink-receiving layer as specified above is formed on the fibrous substrate, and thus the transfer paper for sublimation printing as defined herein is obtained.

Still another aspect of the present disclosure relates to a method for preparing a printed transfer paper. The method comprises the steps of:

(a) providing a transfer paper for sublimation printing as defined above, and
(b) applying a sublimable ink onto the ink-receiving layer by using a printing device, preferably an inkjet printer, to yield a print in a continuous or a non-continuous printing process.

The term "applying" as used herein in the context with the sublimable ink, refers to printing as well as any other process suitable for providing the sublimable ink onto the transfer paper. Printing means the production of writing or images on the transfer paper by using a printing device. Preferably but not limited hereto, such a printing device is an electronic printer which receives information in the form of a digital file. Alternatively, the sublimable ink may also be applied by for instance painting or even pouring a sublimable ink directly onto the transfer paper.

Moreover, the present disclosure relates to the use of a transfer paper for sublimation printing as specified above in a method of preparing a printed transfer paper, wherein sublimable ink is applied to the ink-receiving layer by using a printing device, preferably by an inkjet printer, in a continuous or a non-continuous printing process.

In another aspect, the present disclosure provides a printed transfer paper. The printed transfer paper comprises the transfer paper for sublimation printing as described above and at least one print on the ink-receiving layer, wherein the printing comprises a sublimable ink as specified above.

The present disclosure moreover provides a method for decorating an article. An article as used herein refers to a support material intended to receive at least one print by the sublimation process described herein. The article may be a textile, and other materials having a metal, glass, ceramic, wood, or plastic surface. When the article to be printed by the sublimation process comprises a surface of metal, glass, ceramic, wood or plastic, this surface can be treated with a polyester composition in order to improve the adhesion of the sublimable ink on this surface. Indeed, polyester coatings are known to form covalent bonds with the sublimable inks, this enabling a strong adhesion of the dyes present in the sublimable ink with the surface of the article printed by the sublimation process. The method for decorating an article comprises the step of transferring at least one print from a printed transfer paper specified above onto said article. Transferring the print is done by way of the sublimation as described above.

Generally, the sublimable dye resists transfer at room temperature. Once a transfer temperature is achieved, the sublimable dye can transfer to an article. The precise mechanism of transfer is not necessarily clear. Without wishing to be bound by any theory, it is expected that at least a portion of the sublimable dye gasifies and transfers as a gas to the article. Furthermore, the temperature, pressure, and time available for sublimation printing can affect the extent of transfer. Sublimation temperatures during the sublimation transfer process are at least 60° C. An upper range for the sublimation temperature depends on the materials involved into the sublimation transfer process, e.g., the transfer paper, the article to be decorated by the process as well as other materials that may be involved, such as a protecting tissue as defined below. Preferably sublimation printing is performed at temperatures in the range of about 170° C. to about 220° C., more preferably in the range of about 190° C. to about 210° C. However, temperatures up to 400° C. are also known.

Preferably a sublimation transfer machine comprising a heated press or consisting of a heated press is used for sublimation printing.

Optionally a protecting tissue may be arranged on a surface of the printed transfer paper that is opposite to the surface of the printed transfer paper contacted with the article, for instance between a pressing sheet present on a sublimation transfer machine and the transfer paper. Optionally or in addition to the before-mentioned option, a protecting tissue may be arranged on a surface of the article that is opposite to that surface of the article contacted with the printed transfer paper, for instance between a pressing sheet present on a sublimation transfer machine and the article. A protecting tissue is a fibrous material used to catch ink sublimating during the transfer process, protecting the equipment from contamination. This protecting tissue is aimed at preventing the dusting of at least some parts of the sublimation transfer machine.

Furthermore, another aspect of the present disclosure relates to the use of a printed transfer paper as described above in a method of decorating an article. Herein, at least one print on the printed transfer paper is transferred to the article by the sublimation process described above. Optionally, a protecting tissue may be used as described above.

In a last aspect, the present disclosure provides a decorated article. The decorated article comprises at least one print that is transferred to the article as described above, wherein the article acts as a support material receiving the at least one print by the sublimation process. The decorated article may be made of textile, plastic, metal, ceramic, glass, wood or a combination thereof. An article made of a textile may for example be fashion, sportswear, flags or carpets. An article made from textile, plastic, metal, ceramic, glass, wood or a combination thereof may for instance be a smart phone cover, a picture frame, a button, a storage container, an eyeglasses frame, a sport equipment, a merchandising article (a clock, a mouse pad, a keychain, a coaster), a pin badge, a stapler, a shoe or parts thereof.

EXPERIMENTAL PART

The formulations of the ink-receiving layer of the exemplary transfer papers for sublimation printing of the disclosure are specified below. The ink-receiving layers are formed from ink-receiving compositions, obtained by heating the binders in water before the other components are added. The amount of added water varies in dependence of the solid content of the components of the ink-receiving layer provided as dispersions. In the following examples, the solid content is adjusted to about 30 wt. %, based on the total quantity of the ink-receiving composition. The ink-receiving compositions is then applied onto one surface of a fibrous substrate using a Meyer rod and dried in a last step to obtain transfer papers for sublimation printing as defined herein comprising an ink-receiving layer.

In all of the following examples a fibrous substrate comprising 30% softwood and 70% hardwood and having a basis weight of 70 g/m$^2$, a Water Copp 60" value of 80 g/m$^2$, a Bendtsen Air Permeability of 150 mL/min has been used.

After forming the ink-receiving layer as described below for Examples 1 to 20 and Comparative Examples 1 to 5, a barrier layer is formed from a barrier composition that is obtained by heating 17 wt. % starch in water. The barrier composition is then cooled and applied onto the surface of the fibrous substrate opposite to the surface carrying the ink-receiving layer by using a Meyer rod.

Printed transfer papers are prepared by printing the exemplary transfer papers described below with a black ink (SAWGRASS Sublijet black) by using a SAWGRASS SG400 printer for a black pattern, or with EPSON UltraChrome DS inks by using an EPSON ET-7750 printer for a colored pattern.

Decorated articles, for these particular embodiments, are obtained by sublimation printing on a polyester fabric. The transfer of the print from the printed transfer papers described above by sublimation printing is conducted in a press at 210° C. for 1 minute.

Characterization

Figure 3:
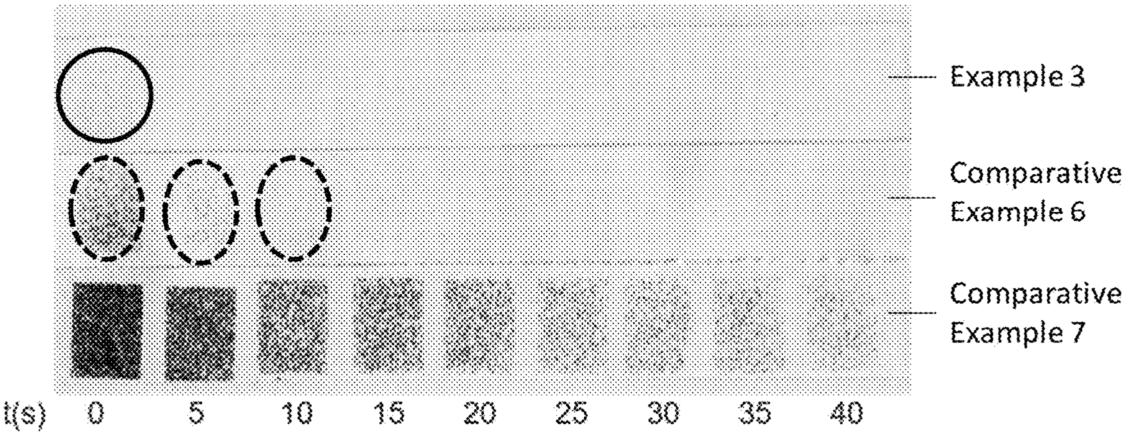
FIG. 3: Represents a picture showing drying test results for an inventive Example and two Comparative Examples.

The drying time is determined right after printing by pressing a stripe of white copy paper (80 g/m$^2$ copy paper from Clairefontaine) against a solid black printed rectangle with a size of 1 cm×1.2 cm (see FIG. 3).

The optical density after transfer of the print to the polyester fabric by the sublimation process is measured using an X-rite eXact Basic spectrodensitometer.

The dusting is measured by placing a commercially available transparent adhesive tape on the coated surface. This tape is then removed and stuck onto a black paper. In case of dusting, parts of the white components of the ink receiving layer are removable and clearly visible on the black paper.

The Cobb value of a transfer paper is measured according to the ISO 535 standard.

The Bendtsen Air Permeability of a transfer paper is measured in accordance with the ISO 5636-3 standard.

The specific charge density at the surface of a transfer paper is measured by the following method using a Mütek™ PCD-05 device.

Sample preparation: A transfer paper is cut in 10*10 cm$^2$ samples. Each sample is then folded at 1.5 cm from the edges to form a cup by stapling the edges in a way that the ink-receiving layer comprising the cationic component is at the bottom of the cup, e.g., the bottom surface outside the cup. The resulting bottom area of a cup is 7*7 cm$^2$=49 cm$^2$.

Blank determination: 10 mL of a sodium polyethylene sulfonate (PES-Na) solution (0.001 M in water, by Noviprofibre) are titrated against a polyDADMAC solution (0.001 M in water, by Noviprofibre) to conduct a concentration factor f determination, calculated by mathematical formula (1):

$$f=V_{PES\text{-}Na}/V_{eq} \quad (1)$$

with:

$V_{PES\text{-}Na}$=sample volume to be titrated in [mL]

$V_{eq}$=titrant (polyDADMAC solution) consumption in [mL]

Back titration: For each sample, 10 cups with a bottom surface area of 49 cm$^2$ are prepared. 100 mL of the PES-Na solution are provided in a 1 L beaker. A first transfer paper cup is placed on this solution with the surface to be measured facing the solution while no air is trapped between paper and solution. The cup is left to float on the stirred PES-Na solution (250 rpm) for 10 minutes before it is replaced by the next cup. These steps are repeated until the 10 cups have reacted with the solution. After filtration through sintered glass using a Büchner system, 10 mL (=$V_{PES\text{-}Na}$) of the reaction solution are titrated against the PolyDADMAC solution. The titration is repeated at least 5 times to obtain an average value for the titrant consumption $V_{eq}$. If the start potential is cationic because the concentration of the initial PES-Na solution is too low compared to the cationic charge present on the bottom surface of the sample, the PolyDADMAC solution can be diluted with the PES-Na solution. Dilution factor D will then be taken into account in the calculation. The specific charge density $q_{mol/sqm}$ [mol/m$^2$] of a sample per square meter is calculated by mathematical formula (2):

$$q_{mol/sqm}=(V_{Blank}-V_{eq})*D*C*f/(S*10000) \quad (2)$$

with:

$q_{mol/sqm}$=specific charge density [mol/m$^2$]

$V_{Blank}$=Volume of the initial PES-Na solution measured for the blank determination in [mL]

$V_{eq}$=titrant (polyDADMAC solution) consumption in [mL]

D=dilution factor

C=concentration of the PolyDADMAC solution in [M]

f=concentration factor

S=Surface of the sample [cm$^2$]=49 cm$^2$

10000=factor to convert 1 cm$^2$ into 1 m$^2$

The specific charge density $q_{C/sqm}$ in [C/m$^2$] is obtained by mathematical formula (3):

$$q_{C/sqm}=q_{mol/sqm}*F$$

with:

$q_{mol/sqm}$=specific charge density [mol/m$^2$]

$q_{C/sqm}$=specific charge density [C/m$^2$]

F=Faraday constant=96,485 C/mol

The Parker Print-Surf (PPS) roughness of a transfer paper is measured in accordance with ISO 8791-4:2007 standard.

The basis weights of an ink-receiving layer, a fibrous substrate and a transfer paper are determined in accordance with the ISO 536 standard.

Examples 1 to 7

In Examples 1 to 7 the mass ratio between the hydrophilic binder to the hydrophobic binder is varied from 21:79 to 79:21 (see Table 1 below). The total amount of binder (the sum of the hydrophilic binder and the hydrophobic binder) is adjusted to 19 dry wt. %. The mass ratio between the cationic component (20 dry wt. %) to the filler (61 dry wt. %) is 25:75 in all examples. The ratio between the total amount of the cationic component and the filler to the total amount of binder is 81:19 in all examples.

The cationic component is cationic silica (Sylojet® C30E, Univar Solutions), the filler is calcinated clay (Ansilex® 93, BASF), the hydrophobic binder is butyl-acrylate styrene acrylonitrile (Acronal® S360D, BASF) and the hydrophilic binder is PVOH (Wego 30/98, Wego).

TABLE 1

Amounts of the components in the receiving layers of Examples 1 to 7 expressed in dry wt. %, based on the total dry weight of the ink-receiving layer.

| Example | 1 | 2 | 3 | 4 | 5 | 6 | 7 |
|---|---|---|---|---|---|---|---|
| cationic component (A) | 20 | 20 | 20 | 20 | 20 | 20 | 20 |
| filler (B) | 61 | 61 | 61 | 61 | 61 | 61 | 61 |
| hydrophilic binder (C) | 4 | 6 | 7.5 | 9.5 | 11.5 | 13 | 15 |
| hydrophobic binder (D) | 15 | 13 | 11.5 | 9.5 | 7.5 | 6 | 4 |
| ratio C:D | 21:79 | 32:68 | 39:61 | 50:50 | 61:39 | 68:32 | 79:21 |

Examples 8 to 11

Examples 8 to 11 are equal to Example 3 except that the mass ratio between the cationic component to the filler is varied from 10:90 to 90:10 (see Table 2 below). The mass ratio between the hydrophilic binder (7.5 dry wt. %) to the hydrophobic binder (11.5 dry wt. %) is remained at 39:61, and the mass ratio between the total amount of the cationic component and the filler to the total amount of the binder is kept at 81:19 in all examples.

TABLE 2

Amounts of the components in the receiving layers of Examples 3 and 8 to 11 expressed in dry wt. %, based on the total dry weight of the ink-receiving layer.

| Example | 8 | 3 | 9 | 10 | 11 |
|---|---|---|---|---|---|
| cationic component (A) | 8.1 | 20 | 40.5 | 43.5 | 73 |
| filler (B) | 72.9 | 61 | 40.5 | 37.2 | 8 |
| hydrophilic binder (C) | 7.5 | 7.5 | 7.5 | 7.5 | 7.5 |
| hydrophobic binder (D) | 11.5 | 11.5 | 11.5 | 11.5 | 11.5 |
| ratio A:B | 10:90 | 25:75 | 50:50 | 54:46 | 90:10 |

Examples 12 to 17

Examples 12 to 17 are equal to Example 3 except that the mass ratio between the total amount of the cationic component and the filler to the total amount of the binders is varied.

The amounts of the hydrophilic binder and the hydrophobic binder are adjusted so that the mass ratio between the hydrophilic binder to the hydrophobic binder is remained at 39:61. Likewise of the amounts of the cationic compound and the filler adjusted to keep the mass ratio between the cationic component to the filler at 25:75 in all examples.

TABLE 3

Amounts of the components in the receiving layers of Examples 3 and 12 to 17 expressed in dry wt. %, based on the total dry weight of the ink-receiving layer.

| Example | 12 | 13 | 14 | 3 | 15 | 16 | 17 |
|---|---|---|---|---|---|---|---|
| cationic component (A) | 22.5 | 21 | 20.5 | 20 | 19 | 18.5 | 17 |
| filler (B) | 67.5 | 64 | 62.5 | 61 | 58 | 55.5 | 51 |
| hydrophilic binder (C) | 3.5 | 6 | 6.75 | 7.5 | 9.5 | 10.5 | 13 |
| hydrophobic binder (D) | 6.5 | 9 | 10.25 | 11.5 | 13.5 | 15.5 | 19 |
| Σ A + B | 90 | 85 | 83 | 81 | 77 | 74 | 68 |
| Σ C + D | 10 | 15 | 17 | 19 | 23 | 26 | 32 |
| ratio A + B: C + D | 90:10 | 85:15 | 83:17 | 81:19 | 77:23 | 74:26 | 68:32 |

Examples 18 to 20

Examples 18 to 20 are based on Example 3 wherein the cationic component is varied. Instead of the cationic inorganic component cationic silica, different cationic organic components are used. The cationic silica in Examples 18 to 20 is replaced by non-cationic silica (CAB-O-SPERSE® 2020K, a fumed silica by Cabot). In Examples 18 and 19 the hydrophilic binders are cationic (polyDADMAC, Adifloc RCAS 20 by Adipap; and starch, Hi-Cat® 1134A by Roquette). Moreover, in Example 19 another calcium carbonate filler (Hydrocarb® 90, Omya) than in Example 3 was used together with the cationic starch binder. In Example 20 the hydrophobic binder is cationic (Acronal® 280KD, BASF).

TABLE 4

Ink-receiving layer formulations and amounts of the components in the receiving layers of Examples 3 and 18 to 20 expressed in dry wt. %, based on the total dry weight of the ink-receiving layer.

| Example | | 3 | 18 | 19 | 20 |
|---|---|---|---|---|---|
| cationic component | (A) | cationic silica (20 wt. %) | polyDADMAC (7.5 wt. %) | cationic starch (7.5 wt. %) | cationic styrene-acrylate (11.5 wt. %) |
| filler | (B) | calcinated clay (61 wt. %) | calcinated clay (61 wt. %), silica (20 wt. %) | | |
| hydrophilic binder | (C) | PVOH (7.5 wt. %) | none in addition to (A) | | PVOH (7.5 wt. %) |
| hydrophobic binder | (D) | styrene-acrylate (11.5 wt. %) | | | none in addition to (A) |

Comparative Examples 1 to 5

Comparative Examples 1 to 5 are based on Example 3, wherein the ink-receiving layer does not comprise a cationic component, a binder mixture or neither: In Comparative Example 1, no cationic component as specified herein is present, while Comparative Examples 2 and 3 lack a binder mixture as defined herein. In Comparative Examples 4 and 5 neither a cationic component nor a binder mixture is present.

TABLE 5

Amounts of the components in the receiving layers of Comparative Examples 1 to 5 expressed in dry wt. %, based on the total dry weight of the ink-receiving layer.

| Comparative Example | 1 | 2 | 3 | 4 | 5 |
|---|---|---|---|---|---|
| cationic component (A) | 0 | 20 | 20 | 0 | 0 |
| filler (B) | 81 | 61 | 61 | 81 | 81 |
| hydrophilic binder (C) | 7.5 | 19 | 0 | 19 | 0 |
| hydrophobic binder (D) | 11.5 | 0 | 19 | 0 | 19 |

Comparative Examples 6 and 7

Commercially available high-end transfer papers were investigated as Comparative Example 6 (TextPrint XP HR, 105 gsm, Beaver) and Comparative Example 7 (SX30HS, 95 gsm, Coldenhove). An analysis of these products confirmed that both comparative transfer papers comprise starch on both surfaces of the fibrous substrate and hence a barrier layer as defined herein.

Results

The results for the drying time, definition and dusting are categorized according to the following Table 6.

TABLE 6

Categorization of drying time, definition and dusting.

| | advantageous | acceptable | not acceptable |
|---|---|---|---|
| Drying time (s) | <5 | 5 to 30 | >30 |
| Definition | all the details of original picture visible (+) | some of smallest details are missing (+/−) | from missing details to barely or not recognizable picture (−) |
| Dusting | no particles visible (no) | some particles visible (some) | tape full of particles (yes) |

None of Examples 1-20 showed any back gasing upon sublimation printing.

Hydrophilic Binder to Hydrophobic Binder Ratio

The properties of Examples 1 to 7 are summarized in Table 7 below. As can be taken from the data, Example 3 shows advantageous properties with regard to the drying time, the printing definition and dusting properties.

Increased drying times, probably due to a delayed evaporation of water molecules incorporated into the swollen binder structure have been observed for rather large amounts of the hydrophilic binder. Nevertheless, dusting properties of Examples 4 to 7 are still advantageous, even with rather large amounts of the hydrophilic binder.

Definition slightly deteriorates with increased amounts of the hydrophilic binder as well as with increased amounts of the hydrophobic binder, as it is believed that adjusting the ratio within the binder mixture ensures an optimized suppression of binder swelling as well as an enhanced accessibility of the ink-receiving layer for the sublimable ink. Nonetheless, the drying times of Examples 1 and 2 are as advantageous as are the dusting properties of Examples 4 to 7.

Some dusting could be observed for Examples 1 and 2, having a rather large amount of the hydrophobic binder. Without wishing to be bound by any theory, the binding properties of the hydrophobic binder may be inferior to the binding properties of the hydrophilic binder. Despite the observation of some dusting, the drying times of Examples 1 and 2 are advantageous and the definitions are still acceptable.

TABLE 7

Properties of Examples 1-7.

| Example | 1 | 2 | 3 | 4 | 5 | 6 | 7 |
|---|---|---|---|---|---|---|---|
| Ratio C:D | 21:79 | 32:68 | 39:61 | 50:50 | 61:39 | 68:32 | 79:21 |
| Drying time (s) | <5 | <5 | <5 | 10 | 15 | 35 | >40 |
| Definition | +/− | +/− | + | +/− | +/− | +/− | − |
| Dusting | yes | yes | no | no | no | no | no |

Cationic Component to Filler Ratio

The properties of Examples 8 to 11 compared to Example 3 are summarized in Table 8 below. As can be taken from the data, Example 3 shows advantageous properties with regard to the drying time, the printing definition and dusting properties. A rather low amount of the cationic component leads to a slight loss in definition, probably due to a decreased number of binding sites being available for the ink. Moreover, the fine adjustment of the ratio between cationic component and filler seems to be preferably in view of the interplay of the porous structure of the ink-receiving layer with the fibrous substrate to ensure improved drying time, printing definition and low dusting.

While it is likely that the same effect may be achieved by adapting the porous structure of the cationic component and not using any filler, the presence of some filler is preferred as it is easily obtainable in large amounts.

TABLE 8

Properties of Examples 3 and 8 to 11.

| Example | 8 | 3 | 9 | 10 | 11 |
|---|---|---|---|---|---|
| ratio A:B | 10:90 | 25:75 | 50:50 | 54:46 | 90:10 |
| Drying time (s) | 15 | <5 | <5 | <5 | 10 |
| Definition | +/− | + | + | + | + |
| Dusting | no | no | some | some | some |

Total Amount of Cationic Component and Filler to Total Amount of Binder Mixture Ratio The properties of Examples 12 to 17 compared to Example 3 are summarized in Table 9 below. As can be taken from the data, Example 3 shows advantageous properties with regard to the drying time, the printing definition and dusting properties. While the drying time and the definition properties of the examples with rather low amounts of the binder mixture are advantageous, dusting properties increase due to a decreased binding of the cationic component and the filler. In turn, dusting properties are advantageous when large amounts of the binder mixture are used. However, the drying time and definition properties are less preferable with increased binding amounts. Without wishing to be bound by any theory, these improved properties may result from an optimised accessibility of the ink-receiving layer for the sublimable dye, a minimised swelling caused by the carrier solvent, an optimized binding of the ink-receiving layer to the fibrous substrate as well as a high binding efficiency of the sublimable dye to the ink-receiving layer.

TABLE 9

Properties of Examples 3 and 12 to 17.

| Example | 12 | 13 | 14 | 3 | 15 | 16 | 17 |
|---|---|---|---|---|---|---|---|
| ratio A + B:C + D | 90:10 | 85:15 | 83:17 | 81:19 | 77:23 | 74:26 | 68:32 |
| Drying time (s) | <5 | <5 | <5 | <5 | 15 | 30 | >40 |
| Definition | + | + | + | + | +/− | +/− | +/− |
| Dusting | yes | yes | some | no | no | no | no |

Different Cationic Components

The properties of Examples 12 to 17 compared to Example 3 are summarized in Table 10 below. As can be taken from the data, Example 3 shows advantageous properties with regard to the drying time, the printing definition and dusting properties.

When using polyDADMAC or a cationic hydrophobic binder as cationic component, the drying times are still acceptable.

With cationic starch the drying time increases, probably due to the high water-absorbance ability of starch. This may also be the reason for of superior definition property of the other examples over the use of starch as cationic component. However, no dusting is observed when using cationic starch as hydrophilic binder.

When using a cationic hydrophobic binder, definition and dusting properties decrease. Without wishing to be bound by any theory, the hydrophilicity of the ion exchanged styrene-acrylate is probably increased so that the effect of using a hydrophobic binder would be diminished.

TABLE 10

Properties of Examples 3 and 18 to 20.

| Example | 3 | 18 | 19 | 20 |
|---|---|---|---|---|
| cationic component | cationic silica | polyDADMAC | cationic starch | cationic styrene-acrylate |
| Drying time (s) | <5 | 10 | >40 | 10 |
| Definition | + | + | − | +/− |
| Dusting | no | some | no | yes |
| Specific charge density ($C/m^2$) | $7.29*10^4$ | $4.92*10^5$ | $6.26*10^4$ | $7.99*10^4$ |

Absence of Cationic Component and/or Binder Mixture

The necessity of the presence of the cationic component as well as the binder mixture is shown by Table 11 below, summarizing the properties of Comparative Examples 1 to 5 compared to Example 3.

From the data it can be taken that neither the presence of the binder mixture alone (Comparative Example 1) or of the cationic component alone (Comparative Examples 2 and 3) is sufficient to obtain the advantageous properties of the present disclosure. Comparative Example 3, which contained the cationic component according to the disclosure but no binder mixture, even caused such severe dusting that this paper was not acceptable for commercial application. Comparative Examples 4 and 5, not containing either the cationic component or the binder mixture, accordingly, also resulted in very low definition and high drying times. Only by using a cationic component, a hydrophilic and a hydrophobic binder as specified herein together, the properties of the transfer paper surprisingly become significantly improved.

TABLE 11

Properties of Examples 3 and Comparative Examples 1-5.

| Example | Ex. 3 | Comp. Ex. 1 | Comp. Ex. 2 | Comp. Ex. 3 | Comp. Ex. 4 | Comp. Ex. 5 |
|---|---|---|---|---|---|---|
| Drying time (s) | <5 | >40 | >40 | failed in dusting | >40 | >40 |
| Definition | + | − | − | | − | − |
| Dusting | no | no | no | | no | no |

The properties of Example 3 and Comparative Examples 6 to 7 are compared in Table 12 below. As can be taken from the data, Example 3 shows advantageous properties with regard to the drying time. Even though both of Comparative Examples 6 to 7 seem to comprise a barrier layer, Comparative Example 6 nevertheless showed some back gasing.

TABLE 12

Properties of Examples 3 and Comparative Examples 6 to 7.

| Example | Ex. 3 | Comp. Ex. 6 | Comp. Ex. 7 |
|---|---|---|---|
| Drying time (s) | <5 | 5-10 | >40 |
| Definition | + | + | + |
| Dusting | no | + | some |
| Back gasing | no | Yes | no |

TABLE 12-continued

| Properties of Examples 3 and Comparative Examples 6 to 7. | | | | |
|---|---|---|---|---|
| Example | | Ex. 3 | Comp. Ex. 6 | Comp. Ex. 7 |
| Bendtsen air permeability (mL/min) | | 64 | 450 | 10 |
| Cobb ($g/m^2$) | | 86.4 | 40.1 | 44.7 |
| PPS (μm) | | 4.0 | 4.9 | 7.8 |
| Basis weight ($g/m^2$) | ink-receiving layer | 20 | / | / |
| | fibrous substrate | 60 | / | / |
| | transfer paper | 80 | 120 | 68 |

EMBODIMENTS

The present disclosure provides for a transfer paper for sublimation printing, comprising a fibrous substrate and an ink-receiving layer, wherein the ink-receiving layer comprises:

- a cationic inorganic component and/or a cationic organic component in an amount of from 10 to 90 dry wt. %,
- optionally a filler in an amount of up to 75 dry wt. %,
- a hydrophilic binder in an amount of from 5 to 50 dry wt. %, and
- a hydrophobic binder in an amount of from 5 to 50 dry wt. %,
- wherein the amounts in dry wt. % are based on the total dry weight of the ink-receiving layer. [Embodiment 1].

The present disclosure also provides for a transfer paper according to embodiment 1, wherein the amount of the cationic inorganic component and/or the cationic organic component and the filler in the ink-receiving layer is greater than 60 dry wt. %, preferably greater than 70 dry wt. %, based on the total dry weight of the ink-receiving layer. [Embodiment 2].

The present disclosure also provides for a transfer paper according to embodiments 1 or 2, wherein a mass ratio of the cationic inorganic component and/or the cationic organic component and the filler to the hydrophilic binder and the hydrophobic binder is of from 85:15 to 75:25. [Embodiment 3].

The present disclosure also provides for a transfer paper according to any of embodiments 1 to 3, wherein a mass ratio of the cationic inorganic component and/or the cationic organic component to the filler is of from 80:20 to 20:80. [Embodiment 4].

The present disclosure also provides for a transfer paper according to any of embodiments 1 to 4, wherein a mass ratio of the hydrophilic binder to the hydrophobic binder is of from 65:35 to 35:65. [Embodiment 5].

The present disclosure also provides for a transfer paper according to any of embodiments 1 to 5, wherein the cationic inorganic component comprises one or more selected from the group consisting of cationic silica and cationic titanium oxide, preferably the cationic inorganic component comprises cationic silica. [Embodiment 6].

The present disclosure also provides for a transfer paper according to any of embodiments 1 or 5, wherein the cationic organic component comprises one or more selected from the group consisting of cationic polymer, cationic organosilica and cationic metal-organic framework. [Embodiment 7].

The present disclosure also provides for a transfer paper according to any of embodiments 1 or 5, wherein the filler comprises one or more selected from the group consisting of silicate mineral, oxide mineral, hydroxide mineral, sulfate mineral and carbonate mineral, preferably the filler comprises silicate mineral. [Embodiment 8].

The present disclosure also provides for a transfer paper according to any of embodiments 1 or 5, wherein the hydrophilic binder comprises one or more selected from the group consisting of polyvinyl alcohol, starch, carboxymethyl cellulose, alginate and guar gum, preferably the hydrophilic binder comprises polyvinyl alcohol, starch, or carboxymethyl cellulose. [Embodiment 9].

The present disclosure also provides for a transfer paper according to any of embodiments 1 or 5, the hydrophobic binder comprises one or more selected from the group consisting of styrene-butadiene rubber, styrene acrylate, butyl acrylate, acrylonitrile and copolymers thereof, preferably the hydrophobic binder is butyl-acrylate styrene acrylonitrile. [Embodiment 10].

The present disclosure also provides for a transfer paper according to any of embodiments 1 to 10, comprising a barrier layer on a surface of the fibrous substrate that is opposite to the surface of the fibrous substrate carrying the ink-receiving layer. [Embodiment 11].

The present disclosure also provides for a transfer paper according to any of embodiments 1 to 11, having a Cobb value of above 40 $g/m^2$, preferably of 40 to 90 $g/m^2$ measured according to ISO 535. [Embodiment 12].

The present disclosure also provides for a transfer paper according to any of embodiments 1 to 12, having a Bendtsen Air Permeability of less than 100 mL/min, preferably of less than 10 mL/min measured according to ISO 5636-3. [Embodiment 13].

The present disclosure also provides for a transfer paper according to any of embodiments 1 to 13, having an ink drying time of below 5 seconds. [Embodiment 14].

The present disclosure also provides for a transfer paper according to any of embodiments 1 to 14, having a specific charge density of between $10^5$ to $2.10*10^6$ $C/m^2$ measured according to the method described in the specification. [Embodiment 15].

The present disclosure also provides for a transfer paper according to any of embodiments 1 to 15, having a Parker Print-Surf (PPS) surface roughness of 3 to 5 μm measured according to ISO 8791-4:2007. [Embodiment 16].

The present disclosure also provides for a transfer paper according to any of embodiments 1 to 16, wherein the basis weight of the ink-receiving layer is 3 to 10 $g/m^2$ measured according to ISO 536. [Embodiment 17].

The present disclosure also provides for a transfer paper according to any of embodiments 1 to 17, wherein the basis weight of the fibrous substrate is 25 to 140 $g/m^2$ measured according to ISO 536. [Embodiment 18].

The present disclosure also provides for a transfer paper according to any of embodiments 1 to 18, wherein the basis weight of the transfer paper is 28 to 150 $g/m^2$ measured according to ISO 536. [Embodiment 19].

The present disclosure also provides for a transfer paper according to any of embodiments 1 to 19, wherein the cationic inorganic component in the ink-receiving layer is based on particles having a particle size of less than 1 μm. [Embodiment 20].

The present disclosure also provides for a transfer paper according to any of embodiments 1 to 20, wherein the filler in the ink-receiving layer is based on particles, preferably spherical or block-shaped particles, wherein at least 50% of the particles have a particle size of less than 2 μm. [Embodiment 21].

The present disclosure also provides for a method for the preparation of a transfer paper for sublimation printing as defined in any one of embodiments 1 to 21, comprising the steps of:

(i) providing a fibrous substrate, (ii) preparing an aqueous dispersion comprising the cationic inorganic component and/or the cationic organic component, the hydrophilic binder, the hydrophobic binder and optionally the filler to give an ink-receiving composition, and (iii) applying the ink-receiving composition onto the fibrous substrate and drying the ink-receiving composition to form the ink-receiving layer. [Embodiment 22].

The present disclosure also provides for a method for the preparation of a printed transfer paper, comprising the steps of:

(a) providing a transfer paper for sublimation printing as defined in any of embodiments 1 to 21, and (b) applying sublimable ink onto the ink-receiving layer by using a printing device, preferably an inkjet printer, to yield a print in a continuous or a non-continuous printing process. [Embodiment 23].

The present disclosure also provides for a use of a transfer paper for sublimation printing as defined in any of embodiments 1 to 21 in a method of preparing a printed transfer paper, wherein sublimable ink is applied to the ink-receiving layer by using a printing device, preferably by an inkjet printer, in a continuous or a non-continuous printing process. [Embodiment 24].

The present disclosure also provides for a printed transfer paper, comprising a transfer paper for sublimation printing as defined in any of embodiments 1 to 21 and at least one print on the ink-receiving layer, wherein the printing comprises sublimable ink. [Embodiment 25].

The present disclosure also provides for a method for decorating an article, comprising the step of transferring at least one print from a printed transfer paper as defined in embodiment 25 onto the article by sublimation, wherein optionally a protecting tissue may be arranged on a surface of the printed transfer paper that is opposite to the surface of the printed transfer paper contacted with the article and/or on a surface of the article that is opposite to the surface of the article contacted with the printed transfer paper. [Embodiment 26].

The present disclosure also provides for a use of a printed transfer paper as defined in embodiment 25 in a method of decorating an article, wherein the at least one print on the printed transfer paper is transferred to the article by sublimation, wherein optionally a protecting tissue may be arranged on a surface of the printed transfer paper that is opposite to the surface of the printed transfer paper contacted with the article and/or on a surface of the article that is opposite to the surface of the article contacted with the printed transfer paper. [Embodiment 27].

The present disclosure also provides for a decorated article obtained by the method of embodiment 26, wherein the decorated article is made of textile, plastic, metal, ceramic, glass, wood or a combination thereof. [Embodiment 28].

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Unless specified to the contrary herein, all test standards are the most recent standard in effect as of the filing date of this application, or, if priority is claimed, the filing date of the earliest priority application in which the test standard appears.

Although the transfer papers, decorated articles, systems, uses and methods of the present disclosure have been described with reference to exemplary embodiments thereof, the present disclosure is not limited to such exemplary embodiments and/or implementations. Rather, the transfer papers, decorated articles, systems, uses and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A transfer paper for sublimation printing, comprising a fibrous substrate and an ink-receiving layer, wherein the ink-receiving layer comprises:

a cationic inorganic component and/or a cationic organic component in an amount of from 10 to 90 dry wt. %, optionally a filler in an amount of up to 75 dry wt. %, a hydrophilic binder in an amount of from 5 to 50 dry wt. %, and a hydrophobic binder in an amount of from 5 to 50 dry wt. %, wherein the amounts in dry wt. % are based on the total dry weight of the ink-receiving layer.

2. The transfer paper according to claim 1, wherein the amount of the cationic inorganic component and/or the cationic organic component and the filler in the ink-receiving layer is greater than 60 dry wt. % based on the total dry weight of the ink-receiving layer.

3. The transfer paper according to claim 1, wherein:

a mass ratio of the cationic inorganic component and/or the cationic organic component and the filler to the hydrophilic binder and the hydrophobic binder is of from 85:15 to 75:25, and/or a mass ratio of the cationic inorganic component and/or the cationic organic component to the filler is of from 80:20 to 20:80, and/or a mass ratio of the hydrophilic binder to the hydrophobic binder is of from 65:35 to 35:65.

4. The transfer paper according to claim 1, wherein:

the cationic inorganic component comprises one or more selected from the group consisting of cationic silica and cationic titanium oxide, and/or the cationic organic component comprises one or more selected from the group consisting of cationic polymer, cationic organosilica and cationic metal-organic framework, and/or the filler comprises one or more selected from the group consisting of silicate mineral, oxide mineral, hydroxide mineral, sulfate mineral and carbonate mineral and/or the hydrophilic binder comprises one or more selected from the group consisting of polyvinyl alcohol, starch, carboxymethyl cellulose, alginate and guar gum, and/or the hydrophobic binder comprises one or more selected from the group consisting of styrene-butadiene rubber, styrene acrylate, butyl acrylate, acrylonitrile and copolymers thereof.

5. The transfer paper according to claim 1, comprising a barrier layer on a surface of the fibrous substrate that is opposite to the surface of the fibrous substrate carrying the ink-receiving layer.

6. The transfer paper according to claim 1, having:

a Cobb value of above 40 $g/m^2$ measured according to ISO 535, and/or a Bendtsen Air Permeability of less than 100 mL/min measured according to ISO 5636-3, and/or an ink drying time of below 5 seconds, and/or a specific charge density of between $10^5$ to $2.10*10^6$ $C/m^2$ measured according to the method described in the specification, and/or a Parker Print-Surf (PPS) surface roughness of 3 to 5 μm measured according to ISO 8791-4:2007.

7. The transfer paper according to claim 1, wherein:

the basis weight of the ink-receiving layer is 3 to 10 $g/m^2$, and/or the basis weight of the fibrous substrate is 25 to 140 $g/m^2$, and/or the basis weight of the transfer paper is 28 to 150 $g/m^2$, wherein the basis weight is measured according to ISO 536.

8. The transfer paper according to claim 1, wherein the cationic inorganic component in the ink-receiving layer is based on particles having a particle size of less than 1 μm, and/or wherein the filler in the ink-receiving layer is based on particles wherein at least 50% of the particles have a particle size of less than 2 μm.

9. The transfer paper according to claim 1 having a mass ratio of the hydrophilic binder to the hydrophobic binder is of from 50:50 to 35:65.

10. A method for the preparation of the transfer paper of claim 1, comprising the steps of:

(i) providing the fibrous substrate, (ii) preparing an aqueous dispersion comprising the cationic inorganic component and/or the cationic organic component, the hydrophilic binder, the hydrophobic binder and optionally the filler to give an ink-receiving composition, and (iii) applying the ink-receiving composition onto the fibrous substrate and drying the ink-receiving composition to form the ink-receiving layer.

11. A method comprising the steps of:

(a) providing the transfer paper of claim 1, and (b) applying sublimable ink onto the ink-receiving layer by using a printing device to yield a print in a continuous or a non-continuous printing process.

12. The transfer paper of claim 1 having, at least one print on the ink-receiving layer, wherein the at least one print comprises sublimable ink.

13. The method of claim 11 comprising transferring the print from the printed transfer paper onto an article by sublimation, wherein optionally a protecting tissue may be arranged on a surface of the transfer paper that is opposite to the surface of the transfer paper contacted with the article and/or on a surface of the article that is opposite to the surface of the article contacted with the printed transfer paper.

14. The method of claim 13, wherein the decorated article is made of textile, plastic, metal, ceramic, glass, wood or a combination thereof.

15. The transfer paper of claim 2 wherein the amount of the cationic inorganic component and/or the cationic organic component and the filler in the ink-receiving layer is greater than 70 dry wt. % based on the total dry weight of the ink-receiving layer.

16. The transfer paper of claim 4 wherein the cationic inorganic component comprises cationic silica, and/or the filler comprises silicate mineral, and/or the hydrophilic binder comprises polyvinyl alcohol, starch, or carboxymethyl cellulose, and/or the hydrophobic binder comprises butyl acrylate styrene acrylonitrile.

17. The transfer paper of claim 6 having:

a Cobb value of above 40 to 90 $g/m^2$ measured according to ISO 535, and/or a Bendtsen Air Permeability of less than 10 mL/min measured according to ISO 5636-3.

18. The transfer paper of claim 8 wherein the particles are spherical or block-shaped.

* * * * *